US008967594B2

(12) United States Patent
Imgrut

(10) Patent No.: US 8,967,594 B2
(45) Date of Patent: Mar. 3, 2015

(54) APPARATUS AND METHOD FOR FITTING WIRES WITH SEALS OR OTHER ELASTIC WIRE ELEMENTS

(75) Inventor: Peter Imgrut, Cham (CH)

(73) Assignee: Komax Holding AG, Dierikon (CH)

( * ) Notice: Subject to any disclaimer, the term of this patent is extended or adjusted under 35 U.S.C. 154(b) by 848 days.

(21) Appl. No.: 13/075,826

(22) Filed: Mar. 30, 2011

(65) Prior Publication Data

US 2011/0239437 A1 Oct. 6, 2011

(30) Foreign Application Priority Data

Mar. 30, 2010 (EP) .................................... 10158413

(51) Int. Cl.
*B23P 11/02* (2006.01)
*B23P 19/04* (2006.01)
*H01R 43/00* (2006.01)
*H01R 43/28* (2006.01)

(52) U.S. Cl.
CPC .............. *H01R 43/005* (2013.01); *H01R 43/28* (2013.01)
USPC .................... 254/134.3 R; 29/255; 29/243.57

(58) Field of Classification Search
CPC .... H01R 43/00; H01R 43/005; H01R 43/007; H01R 43/20
USPC ...................... 29/244–282, 235, 237, 243.57; 254/134.3 R, 134.3 FT
See application file for complete search history.

(56) References Cited

U.S. PATENT DOCUMENTS

| | | | | | |
|---|---|---|---|---|---|
| 1,944,890 | A | * | 1/1934 | Heidloff | 285/256 |
| 2,657,454 | A | * | 11/1953 | Huyett | 29/450 |
| 4,063,351 | A | * | 12/1977 | Borsuk et al. | 29/881 |
| 4,653,182 | A | * | 3/1987 | Fukuda et al. | 29/754 |
| 5,007,164 | A | * | 4/1991 | Kato | 29/854 |
| 5,083,363 | A | * | 1/1992 | Ransom et al. | 29/523 |
| 5,142,774 | A | * | 9/1992 | Jeffery | 29/810 |
| 5,351,385 | A | * | 10/1994 | Takano | 29/450 |
| 5,926,947 | A | * | 7/1999 | Takano et al. | 29/754 |
| 2008/0155816 | A1 | | 7/2008 | Ikeda et al. | |

FOREIGN PATENT DOCUMENTS

| | | | | | |
|---|---|---|---|---|---|
| EP | 0410416 | A2 | | 1/1991 | |
| EP | 0626738 | A1 | | 11/1994 | |
| GB | 1444245 | A | * | 7/1976 | |
| JP | 05299149 | A | * | 11/1993 | H01R 43/00 |

OTHER PUBLICATIONS

JP 05299149 Machine Translation, Translated May 16, 2014 by Patent Abstracts of Japan.*

* cited by examiner

*Primary Examiner* — Lee D Wilson
*Assistant Examiner* — Tyrone V Hall, Jr.
(74) *Attorney, Agent, or Firm* — Fraser Clemens Martin Miller LLC; William J. Clemens

(57) ABSTRACT

A fitting apparatus for fitting a wire with an elastic wire element has a needle, which has a receptacle. An external diameter at a first end of the needle is smaller than at a second end. Centering jaws are configured to fix the needle and to form in a closed state an orifice, which serves as access to the receptacle of the needle. To push the elastic wire element on, a pusher-on is used. A gripping element holds the needle in an area of the first end. Drives enable relative movements.

8 Claims, 5 Drawing Sheets

APPARATUS AND METHOD FOR FITTING WIRES WITH SEALS OR OTHER ELASTIC WIRE ELEMENTS

CROSS-REFERENCE TO RELATED APPLICATION

This application claims priority to European Patent Application No. 10158413.4, filed Mar. 30, 2010, which is incorporated herein by reference.

FIELD

The present disclosure relates to an apparatus and a method for fitting wires with seals, i.e. it relates to applications in the field of wire processing. The apparatus and the method can also be used on other elastic wire elements.

BACKGROUND

Seals are sealing elements of silicon or similar material, which are generally used for sealing connector housings or, for example, electrical apparatuses. To effect such sealing, a stripped wire is first fitted with a seal and then crimped with a metal contact. The contact is embodied in such manner that it holds the seal tightly on the wire.

Seal-fitting devices may be fully automatic or semiautomatic. Fully automatic seal-fitting devices are used, for example, in wire-processing machines that automatically present the stripped wire to, and remove it from, the seal-fitting apparatus. Semiautomatic seal-fitting devices are typically used as bench top devices, wherein the wire must be inserted into a holding gripper of the seal-fitting apparatus by hand.

In the case of seal-fitting devices that operate on simple fitting principles, the wire is pushed directly into the seal. This carries the risk of the internal contour of the seal being damaged. Moreover, this operation cannot be performed with already stripped wires, since the strands of the wire would then be bent. Although stripping after seal-fitting would be possible, it would result in productivity losses and further disadvantages.

In more advanced seal-fitting devices, before the seal is fitted it is expanded by being pushed onto an expansion collar, which is embodied as a hollow cylinder. When the wire is being fitted, it is pushed into this expansion collar, and then the expansion collar is pulled out between the wire and the seal, which is held by a releaser. A seal-fitting device in which the seals are expanded before being pushed onto a wire is known, for example, from EP-B1-0 410 416.

Known from document US 2008/155816 A1 is a technical solution that allows a flexible seal to be pushed onto a wire. A seal-transfer device and a seal-holding device are used. A seal from a stock is fed into the seal-holding device. Fastened onto the seal-transfer device is a hollow cylindrical body, which is pushed into the seal. Hereinafter, this body is referred to as "hollow cylinder". Before being pushed in, the seal is moved by the seal-holding device into a transfer position. A pressure-body is then deployed to exert counter pressure against the seal from one side while the hollow cylinder is pushed into the seal. During the pushing-in as described, a needle-shaped guide element sits inside the hollow cylinder in such manner that an end of the needle that tapers to a point projects from an opening of the hollow cylinder, the opening facing in the direction of the seal. The hollow cylinder, along with the needle sitting inside it, is pushed into the seal, while the pressure-body exerts counter pressure as stated. As a result of the needle tapering to a point, the joint pushing-in of the hollow cylinder and the needle proceeds gently. After the hollow cylinder has been pushed into the seal, the needle is retracted to create room inside the hollow cylinder to push-in a wire-end. After the wire-end has been pushed in, the hollow cylinder is retracted, and hence the seal is transferred from the hollow cylinder onto the wire.

The following describes characteristic features, as well as advantages and disadvantages, of the two most common fitting principles. A more easily maintainable and more rapidly operating seal-fitting device is disclosed in EP-B1-0 626 738. EP-B1-0 626 738 discloses a seal-fitting device in which a seal, on being removed individually from a feeder-rail, is mounted onto an arbor and, on the arbor, is pushed from a smaller to a larger diameter so as to expand the seal. After the arbor has been swiveled into the correct position, an expansion collar, which is embodied bipartitely, and a releaser, which is also embodied bipartitely, embrace the seal. By means of a relative movement of the releaser, the seal is pushed onto the expansion collar. The fitting operation per se is performed by the expansion collar, along with the seal and the releaser, moving over the wire. During the operation, the releaser remains stationary until the expansion collar has completed its movement, which causes the seal to be released onto the wire.

It is an advantage of this approach that the seal is expanded in gently progressive manner. Moreover, the seal cannot slip off the expansion collar, since the former is held by the releaser. Disadvantageous is that through the bipartite embodiment of the expansion collar, the latter has a relatively large external diameter, since the wall thickness cannot be reduced limitlessly.

EP-B1-1 022 821 discloses a further apparatus for seal-fitting. After the seal has been individually picked, it is mounted on a tubular monopartite expansion collar. While the seal is being swiveled into the horizontal fitting position, it is not additionally held. After the seal is embraced by a bipartite releaser, fitting takes place through movement over the wire, followed by retraction of the expansion collar.

This approach has the advantage that the monopartite expansion collar can be embodied very thin-walled, as a result of which the seal need be only slightly widened. Disadvantageous is that, with certain types of seal, it is difficult to push the seal onto the expansion collar without the seal subsequently slipping off again. The great elasticity of the seal hinders the pushing-on operation.

Both fitting principles have the disadvantage that, when the seal is being pushed onto the expansion collar and being released, the seal is not supported on the same shoulder, and hence is pressed together in two opposite directions. This can cause folding-back of the seal, and in series production generally results in a greater variation of the position of the seal.

SUMMARY

There is therefore a need for providing a remedy. The various embodiments of the technologies disclosed herein enable a simple, certain, and rapid fitting of wires with elastic wire elements, for example with seals.

Advantageous further developments of the invention are stated in the dependent patent claims.

The fitting principle disclosed herein can be used in both fully automatic and semiautomatic (seal-) fitting devices. The former are used in wire-processing machines that automatically feed the stripped wire to, and remove it from, the seal-fitting device. By contrast, semi-automatic seal-fitting devices are used as bench top devices, in which the wire must be inserted into a holding gripper by hand.

Depending on various requirements, however, wires are also fitted with other elastic wire elements, for example, a shrink-tube, or a ring-shaped element, through which the wire is passed. The various embodiments can be used not only for fitting wires with seals, but also for fitting wires with other elastic wire elements.

The embodiments of the device are particularly suitable for use in wire-processing machines.

Advantageously, the seal is not pushed onto a hollow cylinder but onto a needle, and transferred off the needle onto a wire. The transfer hence takes place preferably directly off the needle onto the wire.

BRIEF DESCRIPTION OF THE DRAWINGS

The various disclosed technologies will be explained in more detail symbolically and by way of example on the basis of the figures. The figures are described conjunctively and in general, wherein.

DETAILED DESCRIPTION

Central to the technologies disclosed herein is a novel fitting principle, which is diagrammatically represented in FIGS. 1A to 1G and described below. Shown above FIGS. 1A to 1G is an x-axis. By reference to this x-axis, various positions are defined to permit better description of the individual movements. It should be noted here that all movements are relative. These relative movements can also be realized differently than in the example represented in FIGS. 1A to 1G.

Figures 1A, 1B, 1C, 1D, 1E, 1F, 1G:
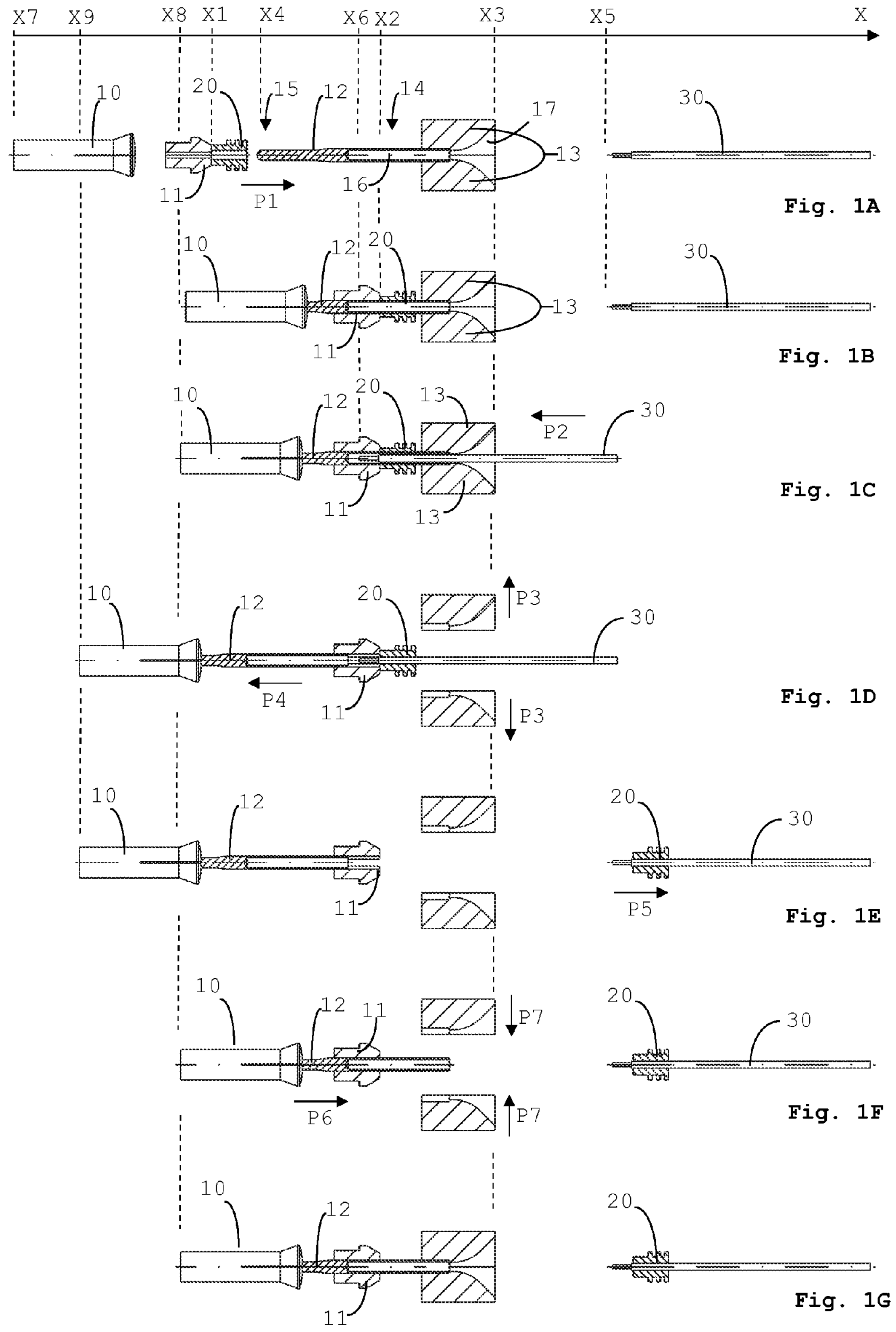
FIG. 1A shows a diagrammatical representation of a first operation step.
FIG. 1B shows a diagrammatical representation of a second operation step.
FIG. 1C shows a diagrammatical representation of a third operation step.
FIG. 1D shows a diagrammatical representation of a fourth operation step.
FIG. 1E shows a diagrammatical representation of a fifth operation step.
FIG. 1F shows a diagrammatical representation of a sixth operation step.
FIG. 1G shows a diagrammatical representation of a seventh operation step.
Figure 2:
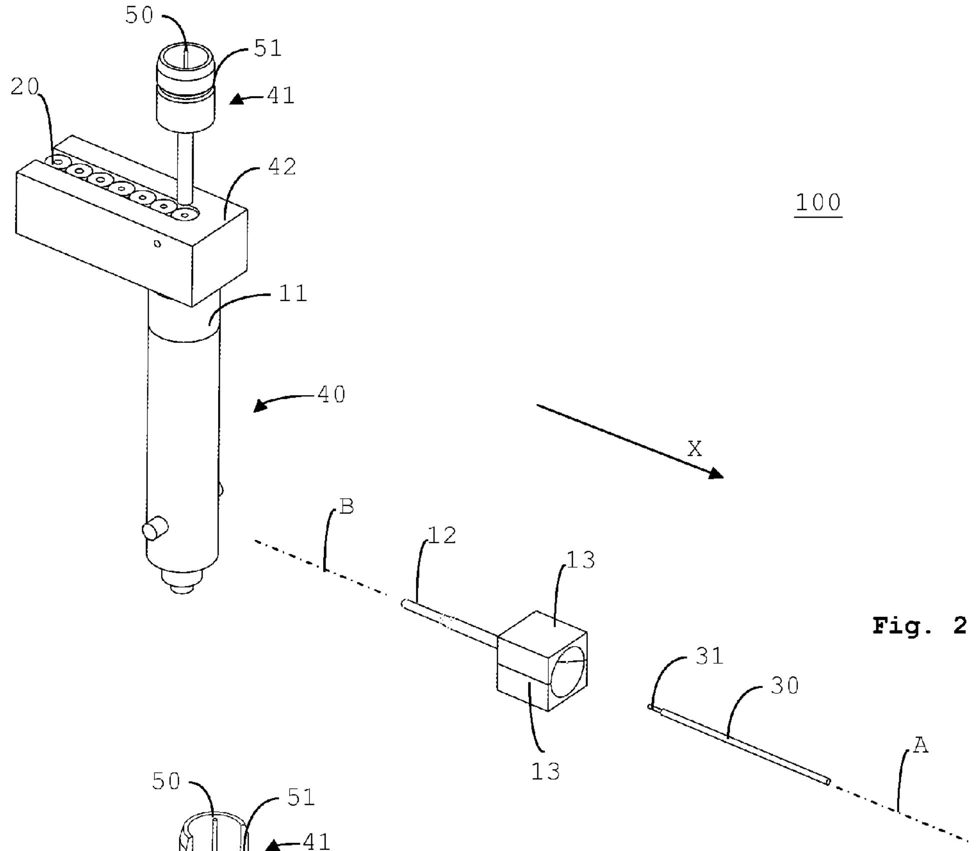
FIG. 2 shows a three-dimensional diagrammatical representation of an apparatus.

An elastic seal 20, or another elastic wire element, is pushed onto a needle 12, as shown in FIG. 1A. Before being pushed on, the seal 20 sits in a position x1. When the seal 20 is pushed on, it reaches the position x2, as shown in FIG. 1B.

The needle 20 has two external diameters D1 and D2 (see also FIG. 7) and, at a first end 14 with the larger external diameter D2, is provided with a blind bore 16, which has an internal diameter D1, which is slightly larger than the external diameter of the wire 30 that is to be fitted. At the beginning, this first end 14 of the needle 12 is held by closed centering jaws 13 of a centering gripper, which, as shown in FIG. 1A, stand in a position x3. The centering gripper is only indicated diagrammatically in FIG. 9. The second end 15 of the needle 12 stands at a position x4 and has a smaller external diameter D1, which approximately corresponds to the internal diameter of a pass-through aperture 21 of the (unfitted) seal 20 (see FIG. 8). The seal 20 is pushed over this end 15, which at the beginning is freestanding, onto the needle 12. This pushing-on movement P1 is executed by a pusher-on 11, which is provided with sprung jaws 44 (referred to as pushing-on jaws), which can adapt to the diameter of the needle 12, which diameter varies along the longitudinal axis from D1 to D2. In the example shown, the pushing-on movement P1 travels a linear distance whose length is defined by a difference x2-x1.

Shown in FIG. 1B is a state after the seal 20 has been pushed onto the needle 12. The seal 20, along with the pusher-on 11, now sits on the area of the needle 12 that has a larger external diameter than the end 15 of the needle 12. The feathered jaws of the pusher-on 11 enable automatic adaptation of the gap between the jaws 44 (see FIG. 3) to a changing external diameter of the needle 12.

In this example, the centering jaws 13 of the fitting device, or of the fitting apparatus 100, are embodied locationally fixed, and remain at the position x3. Here, the centering jaws 13 can only execute an opening or closing movement perpendicular to the x-axis. Under certain circumstances the centering jaws 13 can be manually displaced and fixed, to enable adaptations to be performed depending on the size and shape of the seal 20.

In another (not shown) embodiment, the centering jaws 13 are executed to be movable, so that they can execute a feeding movement parallel to the x-axis in the direction of the wire 30. In this case, no drive (drive A4 in FIG. 9) is required to move the wire 30.

The wire 30 is now inserted through the closed centering jaws 13 into the blind bore 16 of the needle 12. Instead of a blind bore 16, another receptacle (e.g. a through hole, or a fastening lug) can be used to accept a wire-end. In this feed movement, the left end of the wire 30 travels a distance from a position x5 to a position x6. To insert the wire 30, the centering jaws 13 form a central orifice 17, as may be seen in FIGS. 1A to 1G. A state after insertion of the wire 30 into the blind bore 16 of the needle 12 is represented in FIG. 1C. The direction of movement of the wire 12 is indicated by an arrow P2. Here, it should be noted that the wire 30 can be, for example, also inserted into the needle 12 before the seal 20 is pushed on from the left. The wire 30 can also remain in the position x5 while the centering jaws 13, along with the needle 12, are moved towards the wire 30.

When the pushing-on movement P1 of the seal 20 is complete and the wire 30 has been inserted into the blind bore 16, as shown in FIG. 1C, the second end 15 of the needle 12 is held by a gripping element 10. For this purpose, the gripping element 10 is moved from a position x7 into a position x8. The centering jaws 13 of the centering gripper are then opened. This instant is shown in FIG. 1D. The opening movement of the centering jaws 13 is indicated by the two arrows P3.

The fitting per se, i.e. the transfer of the seal 20 to the wire 30, is executed by a backwards movement P4 of the gripping element 10, as shown in FIG. 1D. In this backwards movement P4, the gripping element 10, along with the needle 12, executes a movement from the position x8 to the position x9. Through this backwards movement P4, the needle 12 is pulled out between the seal 20 and the wire 30. During the backwards movement, the seal 20 is held in its position x2 by the stationary pusher-on 11. The backwards movement P4 is executed by the gripping element 10, which holds the needle 12 and moves it to the left.

After the fitted wire 30 is then moved away to the right (from the position x6 to, for example, the position x5), as shown with an arrow P5 (opposite in direction to the backwards movement P4), the needle 12 is moved back into the starting position by a movement P6 of the gripping element 10. There, the gripping element 10, along with the needle 12, executes a movement from the position x9 to the position x8. The left end of the needle 12 again reaches the position x4. Shown in FIG. 1F is a state in which the needle 12 has reached the starting position x4.

In the starting position x4, the needle 12 is now again gripped by the closing centering jaws 13. The arrows P7 indicate this closing movement of the centering jaws 13. The state with gripped needle 12 is represented in FIG. 1G.

The gripping element 10 can now release the needle 12 and the next seal 20 can be pushed onto the needle 12, as described above. The gripping element 10 is, for example, returned into the position x7.

A preferred constructive embodiment of the fitting apparatus is presented below and described with reference to FIGS. 2 to 6.

The pusher-on 11 and the gripping element 10 are preferably integrated in a fitting-head 40, which is part of a fitting device or of a fitting apparatus 100. Assuming that the seals 20 are fed in a horizontal feeder-rail 42 in accordance with the state of the art described at the outset, the fitting-head 40 is embodied in such manner that it can execute a swiveling movement in the wire-axis A and the longitudinal movements P1, P4, P6 in the direction of the wire-axis A. Here, the wire-axis A runs parallel to the x-axis of FIGS. 1A to 1G. The corresponding swivel drive for executing the swiveling movement in the wire-axis A is not shown.

The fitting principle can also be used for alternative seal-feeds, for example, a horizontal feed of the seal 20 is possible. Shown in FIG. 9 is a corresponding fitting apparatus 100 in which no swiveling movement of the seal-feed is provided.

In the embodiment shown in FIGS. 2 to 6, an individual-picking tool 41 is used that comprises an inner arbor 50 and a collar 51. The individual-picking tool 41 serves the purpose of taking the seals 20 from the feeder-rail 42 to the fitting-head 40. For this purpose, first the inner arbor 50 is pushed through the bore 20 of the seal, and then the seal 20, through lowering of the collar 51, is pressed out of the feeder-rail 42 into the fitting-head 40. This operation is to be seen in FIG. 4, where a seal that is referenced with 20.1 is just being pushed downwards out of the feeder-rail 42 in the direction P8.

Figure 9:
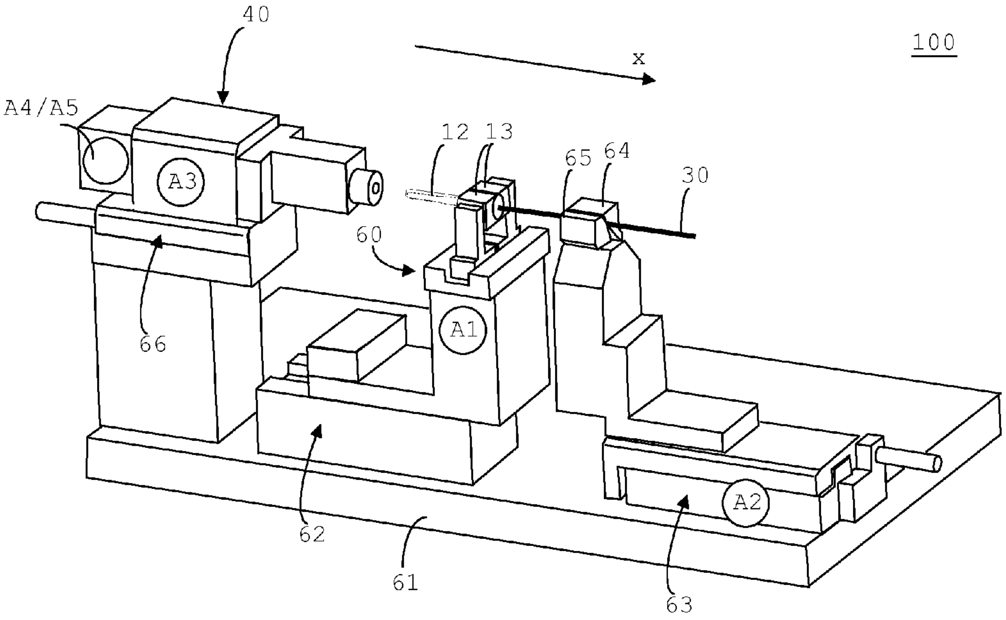
FIG. 9 shows a three-dimensional diagrammatical representation of a fitting apparatus.

The drives A1-A5 that are necessary for the movements of the fitting-head 40 and of the wire 30 are shown purely diagrammatically in FIG. 9. The swiveling movement in the direction of the wire-axis A can be motorized, or also be effected by means of a pneumatic swivel drive. Depending on the requirements, the various longitudinal movements can be effected pneumatically or by means of a programmable longitudinal axis.

Figure 3:
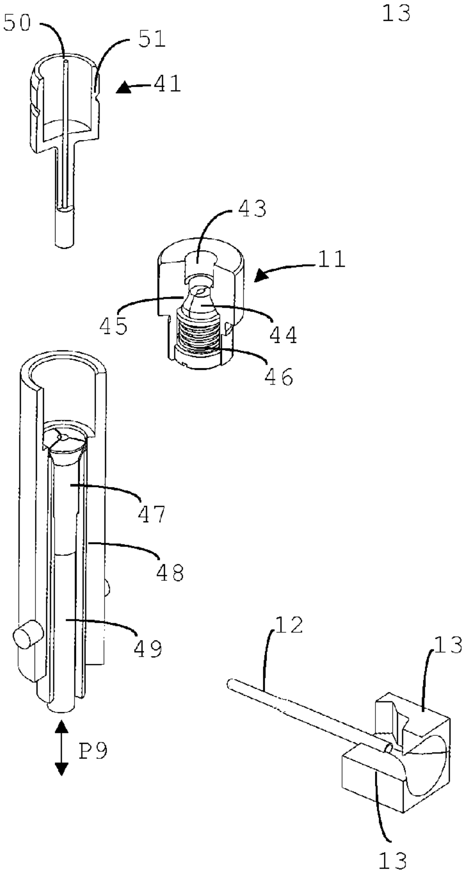
FIG. 3 shows a three-dimensional diagrammatical representation of details of the apparatus shown in FIG. 2.
Figure 4:
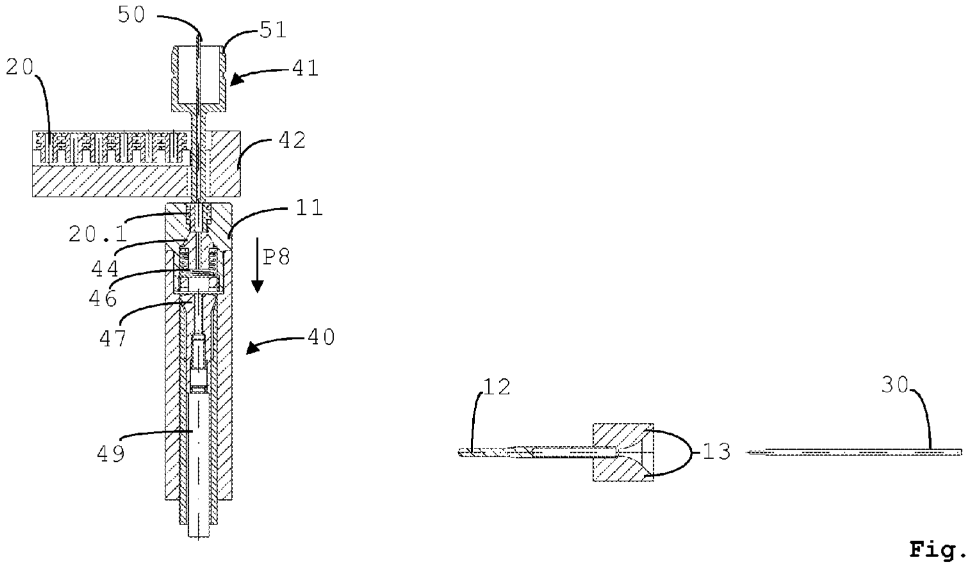
FIG. 4 shows a diagrammatical cross-sectional representation of details of the apparatus shown in FIG. 2.

The pusher-on 11 is preferably constructed as a replaceable unit and embodied in such manner that it can hold the seal 20 in the receptacle bore 43, see FIG. 3. So that the seal 20 cannot fall out during the swiveling movement of the fitting-head 40, the receptacle bore 43 is correspondingly embodied. Also possible would be to hold the seal 20 in the receptacle bore 43 by application of a vacuum. By means of a compression spring 46, the two symmetrically arranged pushing-on jaws 44 of the pusher-on 11 are pressed into the cone 45 of the pusher-on 11 that is arranged behind the receptacle bore 43. During pushing-on, the pushing-on jaws 44, guided by the cone 45, move radially apart, and thereby follow the contour (i.e. the increasing external circumference) of the needle 12. This is necessary because, as described above, the needle 12 has a circumference that changes in the x-direction.

In the case of the fitting-head 40 shown, the gripping element 10 is embodied as a collet 47. Such collets are used, for example, in similar form on lathes. The collet 47 is fastened to a pull-rod 49, with which it can be pulled into a collar 48, which causes the collet 47 to close and, hence, the needle 12 to be gripped. To close or open the collet 47, the pull-rod 49 need only execute a short stroke, which can advantageously be realized with a not-shown pneumatic cylinder, which executes movements in the direction P9.

To be able to execute the necessary steps for the fitting principle, the collet 47 must be capable of movement inside the fitting-head 40 in the open and closed state. This relative movement is advantageously also executed pneumatically.

To open or close the centering jaws 13, a commercially available pneumatic centering gripper 60 (see, for example, FIG. 9) can be used. The centering jaws 13 are designed in such manner that, in their closed state, the needle 12 is securely gripped, and access through an orifice 17 to the blind bore 16 is possible. To prevent bending of the strands 31 of the wire 30, the bore diameter of the orifice 17 of the centering jaws 13 of the centering gripper 60 is embodied slightly smaller than the diameter Di of the blind bore 16 in the needle 12.

Since the seals 20 to be processed vary greatly in their dimensions, the dimensions of the needle 12, of the centering jaws 13, of the pusher-on 11, and of the collet 47, i.e. the dimensions of the gripping element 10, are also variable. These parts should be as easy as possible to replace. The lengths, or distances, respectively, of the longitudinal movements P1, P4, P5, P6 that are indicated by the arrows can, however, remain unchanged, and be adapted to the dimensions of the longest of the seals 20 that is to be processed.

Figure 7:
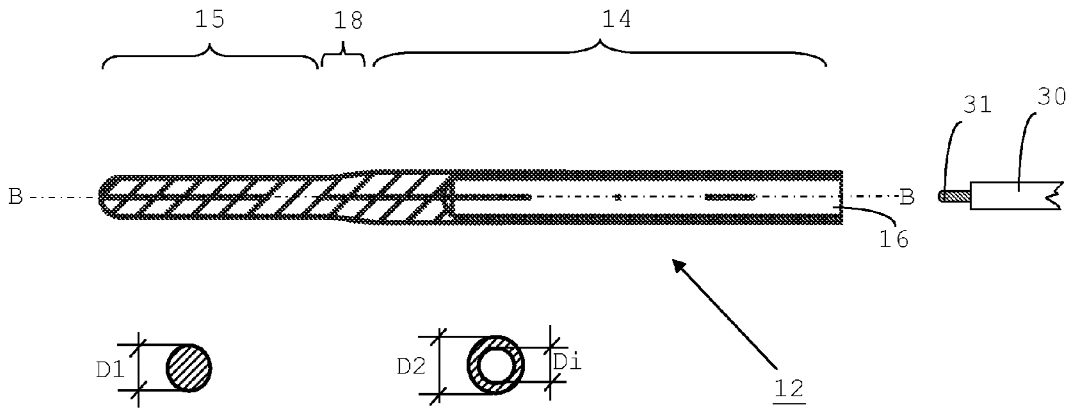
FIG. 7 shows a diagrammatical cross-sectional representation of a needle that can be used, and a section of a wire that is to be fitted.

FIG. 7 shows a diagrammatical cross-sectional representation of a needle 12. The needle 12 that is shown has a blind bore 16 which runs coaxially with the longitudinal axis B of the needle. In all embodiments, the needle 12 is embodied monopartite. The external diameter of the needle 12 is smaller at a first end 15 than at a second end 14. In the example shown, the first external diameter D1 in the area 15, and the second external diameter D2 in the area 14, are constant. Situated between these areas 15 and 14 is a transitional area 18, where the diameter gradually changes from D1 to the diameter D2.

Also possible is that in the area 15 the diameter slowly increases, thereafter to attain the maximum diameter D2 in the end area (in FIG. 7, at the right).

The blind bore 16 preferably extends from the right end of the needle 12 in the direction of the second end 15. In all embodiments, the blind bore 16 ends already before the transition zone 18. The diameters D1, D2, the length of the needle 12, and the depth of the blind bore 16 depend on the constructional shape and size of the seal 20, as well as on the position at which the seal 20 should sit on the wire 30. The internal diameter Di of the blind bore 16 is slightly greater than the external diameter of the wire 30 including insulation.

A section of the wire 30 that is to be fitted is shown to the right of the needle 12, so as to illustrate the dimensions in this diagrammatical representation.

Figure 8:
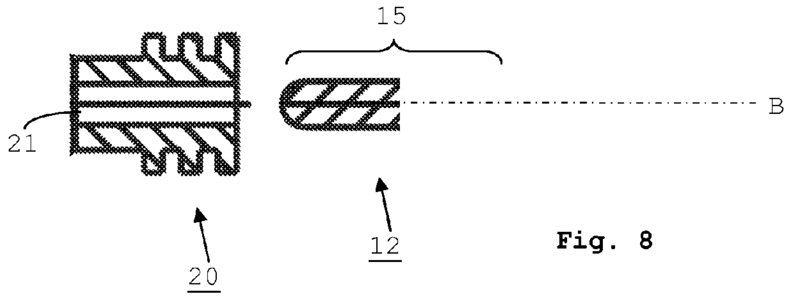
FIG. 8 shows a diagrammatical cross-sectional representation of a thin end of the needle that can be used, and a seal.

FIG. 8 shows a diagrammatical cross-sectional representation of the end-piece 15 of a monopartite needle 12. Shown immediately adjacent to the needle 12 is an exemplary seal 20 with a central pass-through aperture 21. In the finished state, the wire 30 runs through this pass-through aperture 21. Due to the elasticity of the seal 20, the latter sits tightly on the wire 30.

Figure 5:
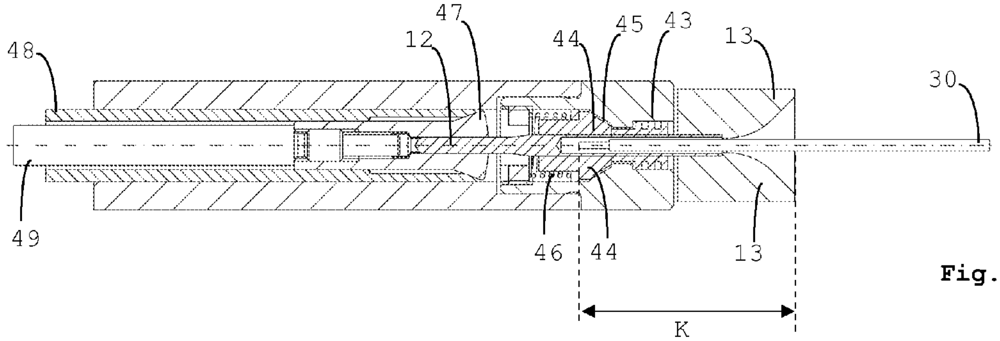
FIG. 5 shows a further diagrammatical cross-sectional representation of details of the apparatus shown in FIG. 2.

FIG. 5 shows in a cross-sectional representation further details of the embodiment that was already described. Shown is an instant before transfer of the seal 20 onto the wire 30. The representation in FIG. 5 corresponds approximately to the situation shown FIG. 1C. Transfer takes place through the backwards movement (arrow P4) of the gripping element along with the needle 12, as described.

Figure 6:
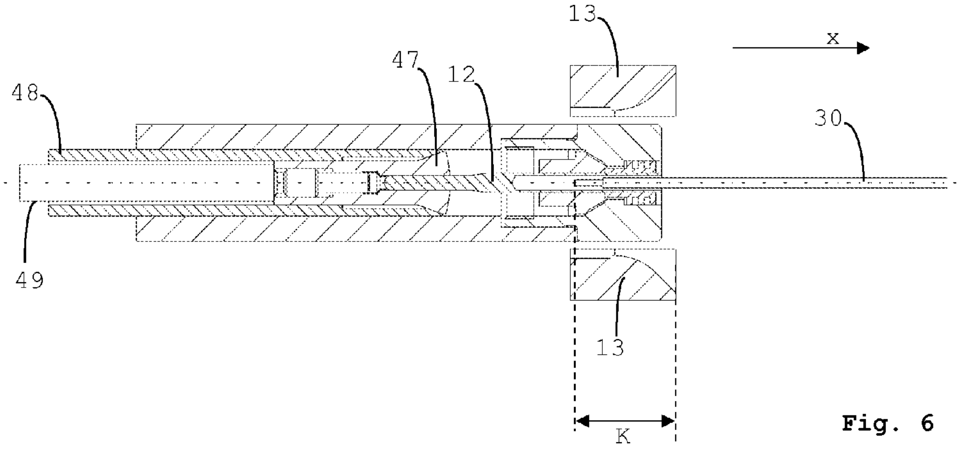
FIG. 6 shows a further diagrammatical cross-sectional representation of details of an apparatus.

Through a changed movement pattern, the various embodiments allow the required free wire-overhang K to be reduced, as indicated in FIG. 6. For this purpose, before release of the seal 20 from the needle 12, the position shown in FIG. 6 is traveled to. In the travel, after opening of the centering jaws 13, the needle 12 is slightly retracted, and the fitting-head 40 is then moved in the x-direction between the opened centering jaws 13 to the wire 30. It should be noted that, in this case, the gripping element 10 must travel to three different positions.

Particularly in the case of so-called "sheathed wires", a short wire-overhang K is advantageous. Here, a plurality of wires is surrounded by a sheath. Before processing takes place, this sheath must be removed. In many cases, the so-called unsheathed length should be kept as small as possible, and depends on the required wire-overhang K.

Shown in FIG. 9 is an exemplary fitting apparatus 100 which has a common machine bed 61. The centering gripper 60 includes the two centering jaws 13 and sits on a first carriage 62, which here can be moved linearly along the x-axis. The first carriage 62 can contain a corresponding first linear drive, spindle drive, or pneumatic drive A1. This drive A1 is integrated into the carriage 62, or built onto this carriage 62. At the instant shown, the centering jaws 13 are holding the needle 12. The wire 30 has already been pushed through the orifice 17 of the centering jaws 13 into the blind bore 16 of the needle 12. For this purpose, a second carriage 63 is provided, which here can be moved linearly along the x-axis. The second carriage 63 can contain a corresponding second linear drive, spindle, or pneumatic drive A2. This drive A2 is integrated into the carriage 63, or built onto this carriage 63. The wire 30 can be held by, for example, two jaws 64, 65. One of these jaws 64, (here the back jaw), can be movable, while the other jaw 65, (here the front jaw), is immovable. Here, the fitting-head 40 is embodied non-swiveling, i.e. it is always aligned in the x-direction, can, however, execute the feeding movements and withdrawal movements parallel to the x-axis, as described at the outset.

The internal structure of the fitting-head 40 can be embodied according to FIG. 5 or FIG. 6. Provided on the fitting-head 40 can be a third carriage 66, which here can be moved linearly along the x-axis. The third carriage 66 can contain a corresponding third linear drive, spindle drive, or pneumatic drive A3. This drive A3 is integrated into the carriage 66, or built onto this carriage 66. Provided in, or on, the fitting-head 40, and indicated in outline, are two drives A4, A5, which are designed to move the gripping element 10 and the pull-rod 49. The various gripper movements and/or other movements are preferably executed pneumatically.

The fitting apparatus 100 shown in FIG. 9 can execute a movement of the centering gripper 60 in the direction of the wire. In principle, this is not necessary for execution of the fitting method described herein, can, however, be used for the (not shown) transfer of the seal 20. This movement of the centering gripper 60 in the direction of the wire is hence optional.

It should be noted that all of the movements can be relative movements. These relative movements are preferably the result of a combination of movements, which are generated by the various drives A1-A5 (which, for example, sit in, or on, the carriages 62, 63, 66). They may, however, also be individual movements caused by only one drive.

Advantageously, the seals 20, or other elastic wire elements, must not be expanded as much as in the state of the art. The treatment and handling of the seals 20, and of other elastic wire elements, is more gentle. Moreover, the risk of damage is reduced. Furthermore, a greater accuracy of the position of the seal on the wire 30 results, and a shorter wire-overhang K is required.

Having illustrated and described the principles of the disclosed technologies, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only examples of the technologies and should not be taken as limiting the scope of the invention. Rather, the scope of the invention is defined by the following claims and their equivalents. We therefore claim as our invention all that comes within the scope and spirit of these claims.

What is claimed is:

1. A fitting apparatus for fitting a wire with an elastic wire element, wherein the fitting apparatus comprises a body to push-on the elastic wire element and is configured to transfer the elastic wire element from the body for pushing onto the wire, the fitting apparatus comprising:

a needle configured as a body for pushing-on, wherein the needle has an external diameter, which at a first end is smaller than at a second end, and in an area of the second end a receptacle configured to coaxially accommodate an end of the wire;

centering jaws configured to fix the needle in the area of its second end, wherein the centering jaws in a closed state fix the needle and form an orifice as an access to the receptacle of the needle and the centering jaws in an open state release the needle;

a pusher-on configured to push the elastic wire element onto the needle from the first end of the needle in a direction of the second end, and a gripping element configured to hold the needle in an area of the first end.

2. The fitting apparatus of claim 1, further comprising:

a first drive configured to execute a first relative movement of the pusher-on relative to the centering jaws;

a second drive configured to execute a second relative movement of the gripping element relative to the centering jaws;

a third drive configured to execute a third relative movement of the wire relative to the centering jaws; and a forth drive configured to open and close the centering jaws.

3. The fitting apparatus of claim 2, wherein the pusher-on is configured to be fixed at predetermined position, while, through the first drive, the needle executes a backwards movement.

4. The fitting apparatus of claim 1, wherein the pusher-on includes sprung pushing-on jaws configured to adapt during a pushing-on movement to a varying external diameter of the needle along a longitudinal axis of the needle.

5. The fitting apparatus of claim 1, wherein the gripping element is embodied as a collet, which contains a pull-rod and sits in a collar, wherein the collet is configured to be opened or closed by a translatory movement.

6. The fitting apparatus of claim 1, wherein the pusher-on and the gripping element are integrated in a fitting-head.

7. The fitting apparatus of claim 1, wherein the elastic wire element is a seal.

8. A fitting apparatus for fitting a wire with an elastic wire element, wherein the fitting apparatus comprises a body to push-on the elastic wire element and is configured to transfer the elastic wire element from the body for pushing onto the wire, the fitting apparatus comprising:

a needle configured as a body for pushing-on, wherein the needle has an external diameter, which at a first end is smaller than at a second end, and in an area of the second end a receptacle configured to coaxially accommodate an end of the wire;

centering jaws configured to fix the needle in the area of its second end, wherein the centering jaws in a closed state form an orifice as an access to the receptacle of the needle;

a pusher-on configured to push the elastic wire element onto the needle from the first end of the needle in a direction of the second end, and a gripping element configured to hold the needle in an area of the first end, wherein the gripping element is embodied as a collet, which contains a pull-rod and sits in a collar, wherein the collet is configured to be opened or closed by a translatory movement.

* * * * *